(12) United States Patent
Choi

(10) Patent No.: US 8,180,196 B2
(45) Date of Patent: May 15, 2012

(54) OPTICAL RECORDING/REPRODUCING APPARATUS AND DATA RECORDING METHOD THEREOF

(75) Inventor: Jeong Il Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1392 days.

(21) Appl. No.: 10/968,943

(22) Filed: Oct. 21, 2004

(65) Prior Publication Data

US 2005/0089307 A1    Apr. 28, 2005

(30) Foreign Application Priority Data

Oct. 28, 2003    (KR) .................. 10-2003-0075397

(51) Int. Cl.
*H04N 5/94* (2006.01)
(52) U.S. Cl. .................. 386/263; 386/239; 369/44.32; 369/53.35
(58) Field of Classification Search .......... 386/5, 6–112, 386/117, 124–126, 120, 239, 241, 263; 711/100, 711/112, 113, 154; 369/375.3, 275.3, 44.32, 369/53.15, 53.35; 345/725; 395/186, 427, 395/481, 490, 821, 856, 857, 561, 580, 591; 707/204

See application file for complete search history.

(56) References Cited

U.S. PATENT DOCUMENTS

| 5,465,350 | A | * | 11/1995 | Fueki ........................... 707/204 |
| 5,619,483 | A | * | 4/1997 | Yokota et al. ............... 369/47.11 |
| 5,657,445 | A | * | 8/1997 | Pearce ........................... 726/23 |
| 5,875,280 | A | * | 2/1999 | Takaiwa et al. ............... 386/120 |
| 5,878,020 | A | * | 3/1999 | Takahashi .................. 369/59.25 |
| 6,078,727 | A | * | 6/2000 | Saeki et al. .................... 386/125 |
| 6,122,436 | A | * | 9/2000 | Okada et al. .................. 386/126 |
| 6,577,811 | B1 | * | 6/2003 | Kikuchi et al. ................. 386/98 |
| 6,813,435 | B1 | * | 11/2004 | Lee et al. ......................... 386/68 |
| 7,058,770 | B2 | * | 6/2006 | Kanai et al. .................... 711/156 |
| 7,099,562 | B1 | * | 8/2006 | Yamamoto ....................... 386/95 |
| 7,215,874 | B2 | * | 5/2007 | Kikuchi et al. ............... 386/241 |
| 7,287,130 | B2 | * | 10/2007 | Lee ............................... 711/154 |
| 2001/0024562 | A1 | * | 9/2001 | Nomura et al. ................. 386/52 |
| 2004/0024654 | A1 | * | 2/2004 | Kanada et al. .................. 705/26 |
| 2004/0033054 | A1 | * | 2/2004 | Haino et al. .................... 386/95 |
| 2004/0033055 | A1 | * | 2/2004 | Hasegawa et al. .............. 386/95 |
| 2004/0184395 | A1 | * | 9/2004 | Lee et al. .................... 369/275.3 |
| 2004/0218488 | A1 | * | 11/2004 | Hwang et al. .............. 369/44.32 |

FOREIGN PATENT DOCUMENTS

| DE | 0790739 | * | 8/1994 |
| JP | 63-56891 | | 3/1988 |
| JP | 04-254977 | | 9/1992 |
| JP | 2002-32975 | | 1/2002 |
| JP | 2002-84498 | | 3/2002 |

* cited by examiner

*Primary Examiner* — Thai Tran
*Assistant Examiner* — Mishawn Dunn
(74) *Attorney, Agent, or Firm* — Staas & Halsey LLP

(57) ABSTRACT

An optical recording/reproducing apparatus and a data recording method thereof. The optical recording and/or reproducing apparatus includes: an encoder which encodes a data for recording in a specified format; an optical pickup which records the encoded data onto a data record area of an optical recording medium which is loaded in the optical recording/reproducing apparatus; and a controller which allocates a specified area of the optical recording medium as a management information record area, controls the optical pickup to record the management information regarding the data being recorded in the data record area to be recorded in the management information record area, and controls the optical pickup to periodically record the management information of the management information record area onto a file information record area of the optical recording medium.

8 Claims, 7 Drawing Sheets

OPTICAL RECORDING/REPRODUCING APPARATUS AND DATA RECORDING METHOD THEREOF

CROSS-REFERENCE TO RELATED APPLICATION

This application claims the benefit of Korean Patent Application No. 2003-75397 filed Oct. 28, 2003, in the Korean Intellectual Property Office, the disclosure of which is incorporated herein by reference.

BACKGROUND OF THE INVENTION

1. Field of the Invention

The present invention relates to an optical recording/reproducing apparatus and a data recording method thereof, and more particularly, to an optical recording/reproducing apparatus and a data recording method thereof, which is capable of reproducing data from the optical recording medium even in the event of abnormal stop of recording on the recording medium.

2. Description of Related Art

Generally, according to whether the optical recording medium has data recording capability or not, the optical recording medium is divided into a reproducing-only medium such as a CD-ROM (compact disk-ROM) and a DVD-ROM (Digital Versatile disk-ROM), a once-recordable medium such as a CD-R (CD-recordable) and a DVD-R, and a repeatedly recordable medium such as a CD-RW (CD-rewritable), a DVD-RW and a DVD-RAM.

An optical recording/reproducing apparatus employs a data handling method in recording data on a recordable medium such as R, RW and RAM, according to which, substantially video and audio data, that is AV data, are directly recorded onto the optical recording medium, with the management information regarding the AV data of the optical recording medium being temporarily stored in an internal memory such as a volatile memory of an optical recording/reproducing apparatus. The temporarily-stored management information of the AV data is updated to the optical recording medium after completion of the data recording. The AV data of the optical recording medium is reproducible only when the corresponding management of the internal memory is updated to the optical recording medium.

However, due to unexpected causes such as an interruption of electric power, the system may be abruptly stopped and therefore the recording operation is stopped prior to completion. The problem is, if the recording operation stops before the management information of the internal memory is updated to the optical recording medium, the management information would be lost. This leads to a situation where the AV data stored in the optical recording medium cannot be reproduced due to the absence of the corresponding management information thereof.

In order to solve the above problematic situation, a recent optical recording/reproducing apparatus employs a non-volatile memory such as an SRAM for the recording of management information. When present, the non-volatile memory prevents loss of management information even when the power is suddenly cut off. However, because the memory is separately added, the structure of the internal circuit becomes complicated, and the price of the product also increases.

BRIEF SUMMARY

Embodiments of the present invention overcome the above-mentioned and/or other problems of the related art, and accordingly, it is an aspect of the present invention to provide an optical recording and/or reproducing apparatus and a data recording method thereof, which is capable of reading data of an optical recording medium even when the recording operation is abruptly stopped in the middle of data recording operation.

The above-mentioned problems of the related art can substantially be resolved by embodiments of the present invention, by processing such that the management information regarding the data being recorded in the optical recording medium can be recorded in a certain designated area of the optical recording medium. To this end, the recording area of the optical recording medium is at least partially allocated as a management information record area. The data record area of the optical recording medium may be partially allocated as the management information record area.

According to an aspect of the present invention, there is provided an optical recording/reproducing apparatus, including: an encoder which encodes a data for recording in a specified format; an optical pickup which records the encoded data onto a data record area of an optical recording medium which is loaded in the optical recording/reproducing apparatus; and a controller which allocates a specified area of the optical recording medium as a management information record area, controls the optical pickup to record the management information regarding the data being recorded in the data record area to be recorded in the management information record area, and controls the optical pickup to periodically record the management information of the management information record area onto a file information record area of the optical recording medium.

According to another aspect of the present invention, there is provided a data recording method, including: allocating a specified area of an optical recording medium loaded in an optical recording and/or reproducing apparatus as a management information record area; encoding data for recording in a specified format; recording the encoded data into a data recording area of an optical recording medium, and recording management information regarding the data being recorded in the allocated management information record area; and periodically copying the management information of the management information record area into a file information record area of the optical recording medium.

According to another aspect of the present invention, there is provided an optical recording and/or reproducing apparatus, including: an encoder which encodes data for recording in a specified format; an optical pickup which records the encoded data onto a data record area of an optical recording medium which is loaded in the optical recording/reproducing apparatus; and a controller which controls the optical pickup to record management information regarding the data being recorded in the data record area in a management information record area which is in a hard disc drive (HDD), and to copy the management information of the management information record area onto a file information record area of the optical recording medium.

According to another aspect of the present invention, there is provided a data recording method including: encoding data for recording in a specified format; recording the encoded data in a data recording area of an optical recording medium loaded in an optical recording/reproducing apparatus, and recording management information regarding the data being recorded in a management information record area in a hard disk drive (HDD); and periodically copying the management information of the management information record area onto a management information file which is recorded in a file information record area of the optical recording medium.

According to another aspect of the present invention, there is provided a data recovery method, including: determining whether a flag is set, the flag being set when a recording operation of the data has not been successfully completed, the flag not being set when the recording operation of the data has been successfully completed; reading management information from a medium based on the determining; and reproducing the data from the medium using the management information. The management information is read from a file information record area of the medium when a recording operation of the data has been successfully completed and from a management information record area of the medium when a recording operation has not been successfully completed.

According to another aspect of the present invention, there is provided a data recovery method, including: determining whether a flag is set, the flag being set when a recording operation of the data has not been successfully completed, the flag not being set when the recording operation of the data has been successfully completed; reading management information from a medium based on the determining; and reproducing the data from the medium using the management information. The management information is read from a file information record area of the medium when a recording operation of the data has been successfully completed and from a management information record area of a hard disk drive (HDD) when a recording operation has not been successfully completed.

According to another aspect of the present invention, there is provided a recording medium, including: a data record area having a management information record area in which is temporarily stored management information regarding a data stream being recorded in the data record area, the management information recorded in the management information record area is updated to the file information record area every time the record of one title is completed; a lead-in area including therein a list of information about the data recorded in the data record area; a file information record area including therein a management information file to manage the data files recorded in the data record area; and a lead-out area including an information indicating the end of the recorded data of the data record area.

According to another aspect of the present invention, there is provided a hard disk drive, including: a data record area having a management information record area which temporarily stores management information regarding a data stream being recorded in the data record area, the management information being updated onto a file information record area of a recording medium every time a recording operation is completed for a title, an area of the management information record area being allocated as a record flag setting area to indicate normality or abnormality in the recording operation; a boot record area including information about the partitioning of the data record area; a FAT area including information regarding cluster position and status of the data stream recorded in the data record area; and a root directory area including attribute information and position information of the data recorded in the data record area. The record flag is set when the recording operation is started, and reset upon completion of the recording operation.

Embodiments of the present invention are also applicable to an optical recording/reproducing apparatus having an HDD. In this case, a certain area of the data record area of the HDD is allocated as the management information record area. Accordingly, the substantive data for recording is recorded in the data record area of the optical record medium, while the management information of the recording data is recorded in the allocated management information record area of the HDD. Because the management information of the recording data is recorded in the HDD, data of the data record area can be properly reproduced by use of the management information which is recorded in the management information record area of the HDD, even when the data recording operation is abruptly interrupted due to unexpected causes such as sudden power cutoff.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
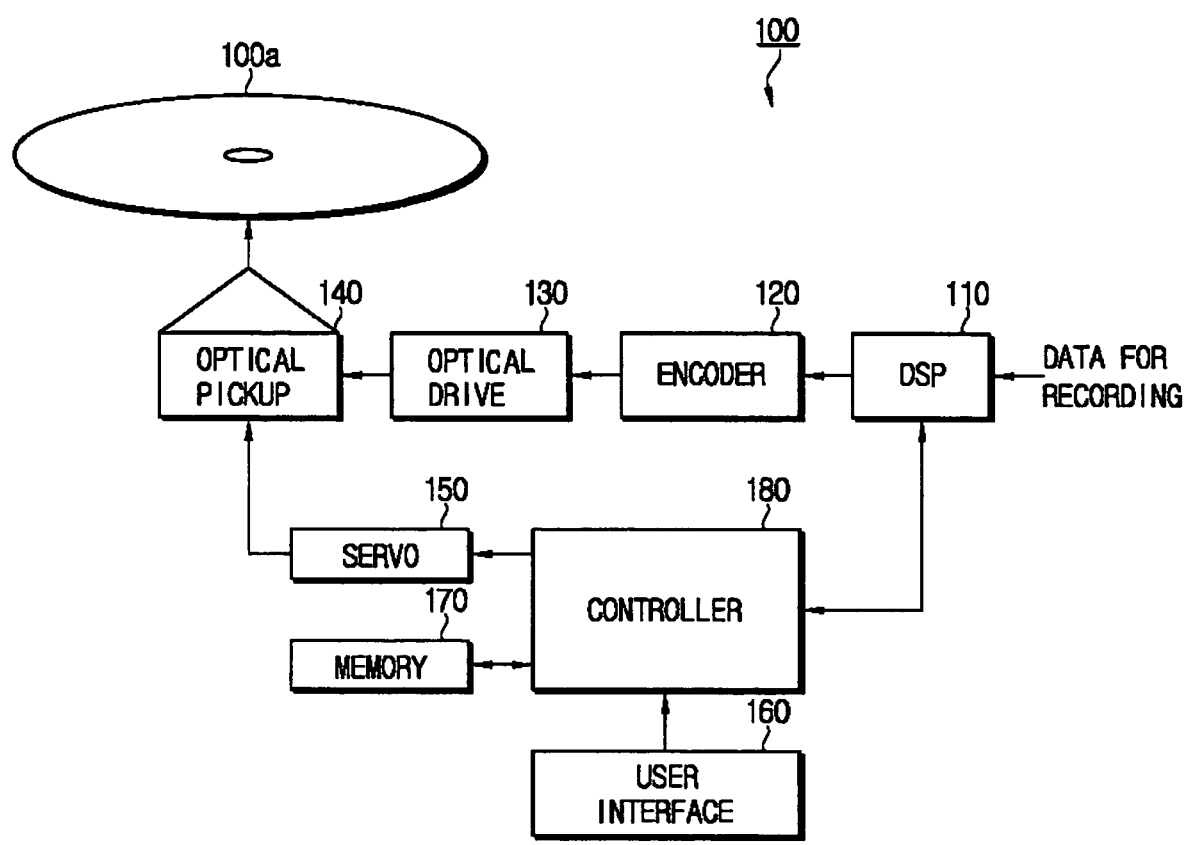
FIG. 1 is a block diagram of an optical recording and/or reproducing apparatus according to a first embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an optical recording/reproducing apparatus according to a first embodiment of the present invention.

Referring to FIG. 1, an optical recording/reproducing apparatus 100 includes a digital signal processor (DSP) 110, an encoder 120, an optical drive 130, an optical pickup 140, a servo 150, a user interface 160, a memory 170 and a controller 180. FIG. 1 shows only the function blocks associated with the recording operation of the optical recording/reproducing apparatus 100 for the sake of brevity.

The DSP 110 converts a video/audio signal (AV signal) provided from a variety of image sources into digital data, and record-formats the digital data by adding information such as error correction code (ECC). Non-limiting examples of these image sources include a terrestrial television broadcast, a satellite broadcast source, digital broadcast sources, a computer and a camcorder.

The encoder 120 encodes under the control of the controller 180 the digital AV data from the DSP 110 in a specified compression format, and generates a substantial data stream. For example, the encoder 120 may use MPEG-2 (Motion Pictures Experts Group-2) format. The MPEG-2 compression is mainly used for motion pictures. If it is still image, the still image compression method, such as JPEG (Joint Photographic Experts Group), may be used, although it is not strictly limited so.

The optical drive 130 drives a laser diode (not shown) provided at the optical pickup 140, to record data stream encoded by the encoder 120 into the optical recording medium 100a as loaded. In the present embodiment, re-writable optical recording media 100a such as DVD-RAM or DVD-RW may be used. In the following description, the DVD-RAM will be used as an example purpose.

The optical pickup 140 adjusts the amount of light from the laser diode in accordance with the drive signal, and accordingly either records and reproduces data with respect to the loaded optical recording medium 100a.

The servo 150 controls servo operations of the optical pickup 140 and a motor driver (not shown), respectively. Here, the motor driver drives a spindle motor (not shown) to rotate the optical pickup 140 the optical recording medium 100a certain linear velocity under the control of the controller 180 which will be described in greater detail below.

The user interface 160 receives a user manipulation signal for the settings or selection of the functions supported in the optical recording/reproducing apparatus 100, and applies the signal to the controller 180. The user interface 160 receives the user manipulation signal through a key manipulation unit provided on the body of the optical recording/reproducing apparatus 100, or from a remote controller. In the present embodiment, the user interface 160 receives a record request signal from the user, and outputs the same to the controller 180.

The memory 170 stores therein control programs and operating programs for the control and management of overall operations of the optical recording/reproducing apparatus 100.

The controller 180, based on the operating programs and the control programs of the memory 170, controls the overall operation of the optical recording/reproducing apparatus 100. In the present embodiment, the optical recording/reproducing apparatus 100 is operated either in a record mode to record data onto the optical recording medium 100a in accordance with the user select signal, or a reproduce mode to reproduce the data from the optical recording medium 100a.

According to one aspect of the present invention, the controller 180 allocates a certain part of the recording area of the optical recording medium 100a as a management information record area.

Figure 2:
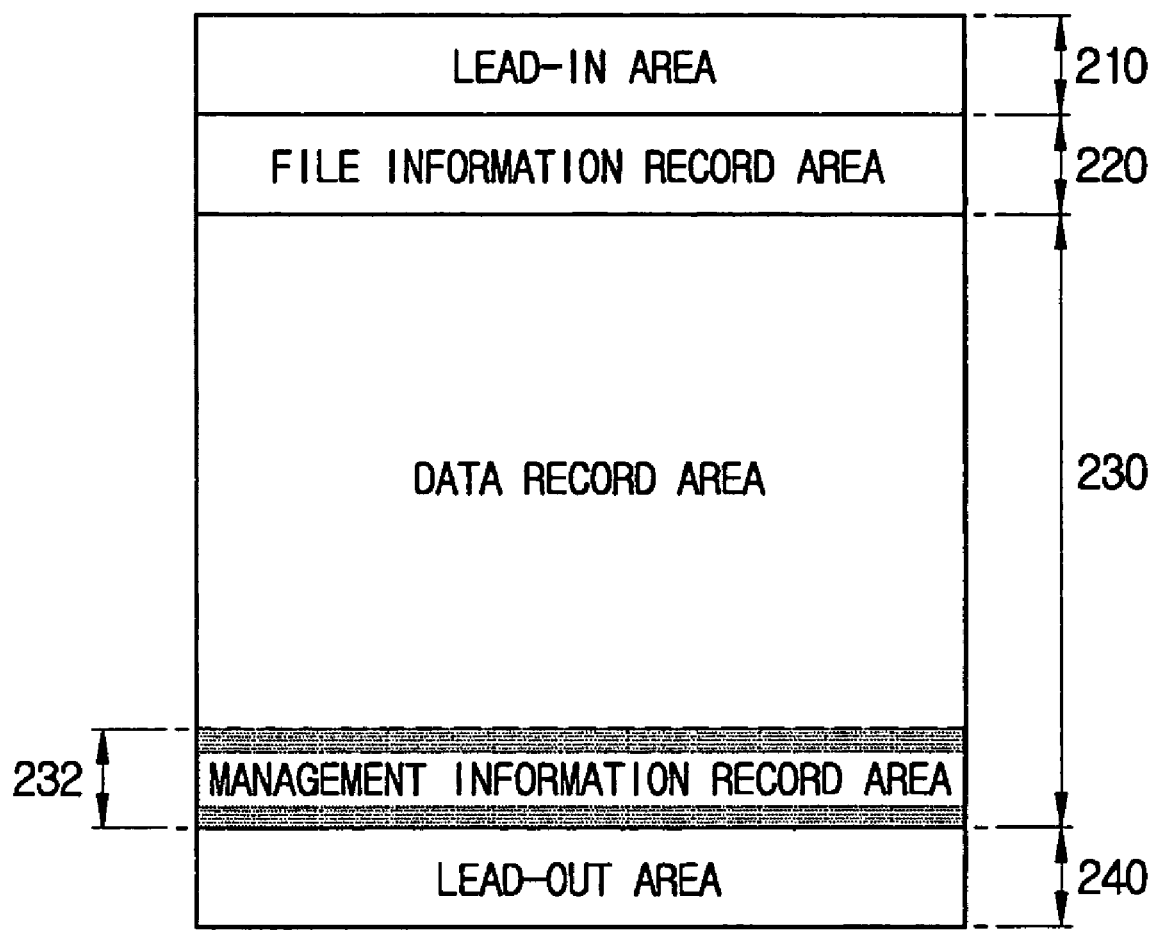
FIG. 2 is a view illustrating data structure of an optical recording medium of FIG. 1.

FIG. 2 shows the data structure of the optical recording medium shown in FIG. 1.

As shown in FIG. 2, the optical recording medium 100a of FIG. 1 according to one aspect of the present invention is divided into a lead-in area 210, a file information record area 220, a data record area 230, a management information record area 232 and a lead-out area 240. The management information record area 232 is the certain area allocated in the data record area 230.

The lead-in area 210 includes therein a list of information about the data recorded in the data record area 230, and the file information record area 220 includes therein a management information file to manage the data files recorded in the data record area 230. The data record area 230 includes therein a data stream, and the lead-out area 240 includes therein an information indicating the end of the recorded data of the data record area 230.

According to one aspect of the present embodiment, the management information record area 232 temporarily stores therein management information regarding the data stream being recorded in the data record area 230. The management information recorded in the management information record area 232 is updated to the file information record area 220 every time the record of one title is completed. The capacity for recording of the management information record area 232 is approximately 512 Kbytes, and therefore, does not affect the capacity of the data record area 230.

Figure 3:
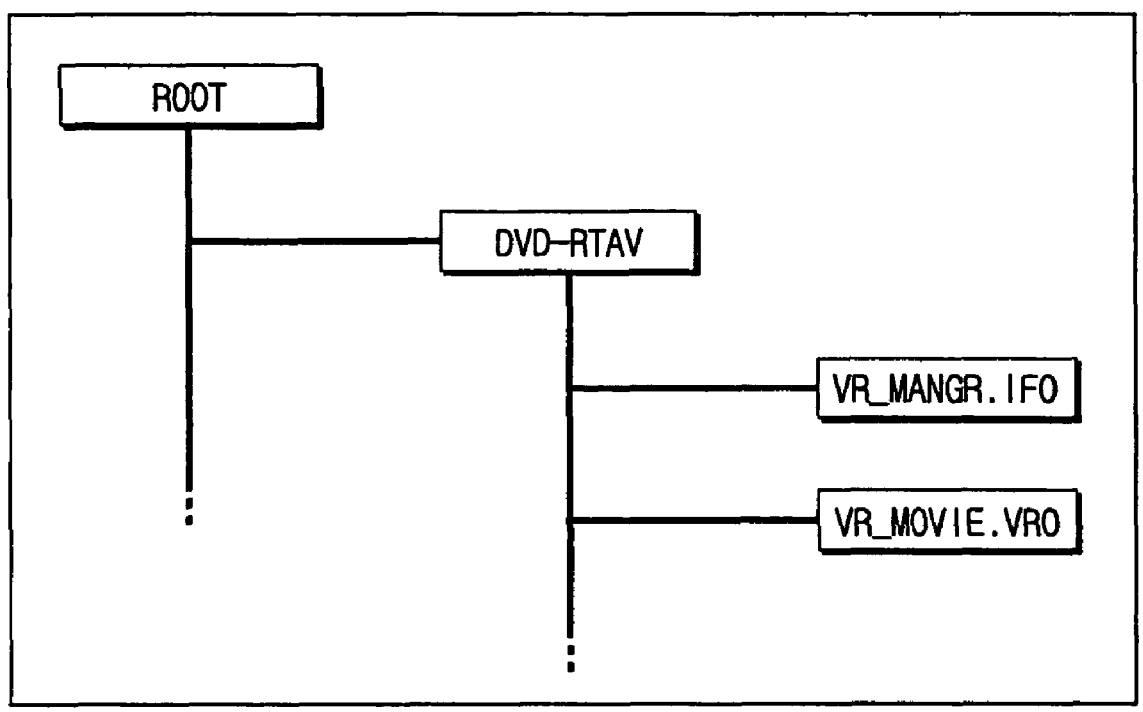
FIG. 3 is a view illustrating the directory structure of the optical recording medium of FIG. 1.

Generally, an optical recording medium 100a having the data structure as described above is managed by the universal disk format (UDF) file system. The file structure of DVD-RAM, as shown in FIG. 3, consists of a root directory, and a DVD real-time record audio video (DVD_RTAV) under the root directory. Under the DVD-RTAV directory, there are AV files (VR_MOVIE.VRO) containing at least one video object (VOB) and management information file (VR_MANGR.IFO) containing several types of management information. In the present embodiment of the invention, the management information recorded in the management information record area 232 is copied to the management information file (VR_MANGR.IFO) recorded in the file information record area 220, every time the recording operation regarding one title is completed. The information recorded in the management information file (VR_MANGR.IFO) may include title name of AV data, number of titles, start time of VOB recording, time information (such as year/month/date/hour/minute/second) on the first image data recording of VOB, management information for time MAP information (TMAPI), and information on VOBU (VOB unit) contained in the VOB.

Referring to FIGS. 1-3, the controller 180 controls the optical pickup 140 such that the substantial data stream is recorded in the data record area 230 of the optical recording medium 100a, and the management information is recorded in the management information record area 232 which is allocated in the data record area 230. The above operation repeats until the recording operation of one title completes, and upon completion of recording of one title, the management information recorded in the management information record area 232 is copied onto the management information file (VR_MANGR.IFO). To this end, the optical pickup 140 may have data seek speed and data record speed fast enough to record corresponding information in the two respective record areas within a specified limited time.

A certain area of the management information record area 232 is allocated as a record flag setting area to indicate normal or abnormal ending of the recording operation. The controller 180 sets a record flag when starting the recording operation in accordance with the record request signal. The controller 180 resets the record flag when the management information recorded in the management information record area 232 is successfully copied onto the management information file (VR_MANGR.IFO) recorded in the file information record area 220.

Figure 4:
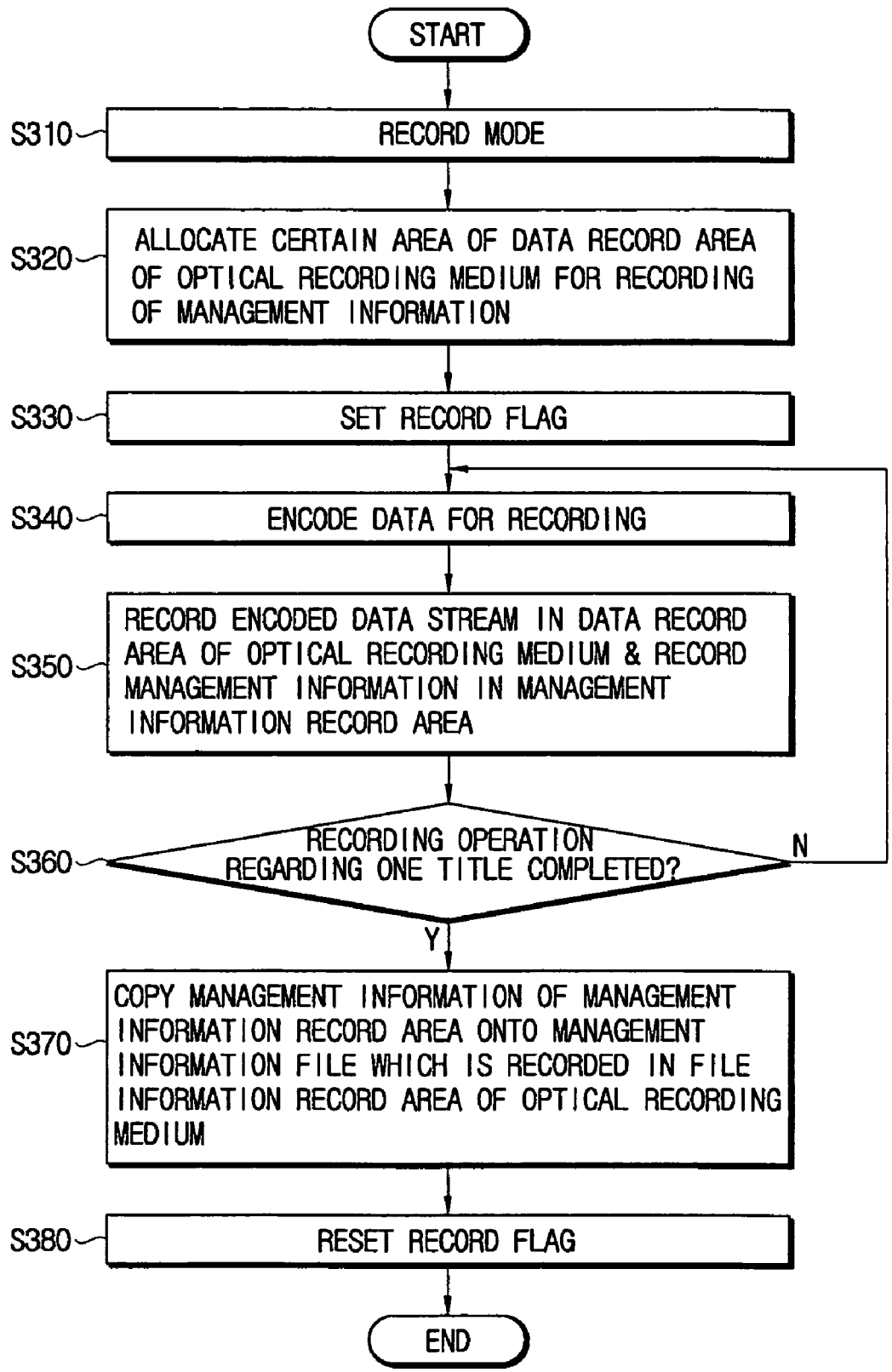
FIG. 4 is a flowchart illustrating the data recording method of the optical recording/reproducing apparatus of FIG. 1.

FIG. 4 is a flowchart illustrating the data recording method of the optical recording/reproducing apparatus of FIG. 1.

Referring to FIGS. 1 through 4, when the optical recording/reproducing apparatus 100 is set to record mode in accordance with the record request signal from the user interface 160 (operation S310), the controller 180 allocates a certain area of the data record area 230 of the optical recording medium 100a which is loaded in the optical recording/reproducing apparatus 100, as for a management information record area 232 (operation S320). The controller 180 then sets a record flag which is allocated to the management information record area 232 (operation S330).

Next, the controller 180 controls the encoder 120 to encode the data which is converted by the DSP 110 to a certain record format (operation S340). The encoder 120 generates a data stream of video object unit (VOBU) in accordance with the control of the controller 180, and transmits the information (VOBUI) regarding the VOBU to the controller 180 every time the encoder 120 generates the data stream.

The controller 180 controls the optical pickup 140 such that, every time the data stream in VOBU is generated by the encoder 120, the encoded substantial data stream is recorded in the data record area 230 of the optical recording medium 100a, with the management information regarding the currently-recording data stream being recorded in the management information record area (operation S350).

The controller 180 confirms whether the recording operation on one title is completed (operation S360), and if not, returns to the operation S340 to continue the recording operation. If the controller 180 confirms that the recording operation on one title is completed, the controller 180 controls the optical pickup 140 to copy the management information of the management information record area 232 onto the management information file (VR_MANGR.IFO) of the file information record area 220 (operation S370). After that, as the copying into the management information file (VR_MANGR.IFO) is completed, the controller 180 resets the record flag (operation S380).

According to a first embodiment of the present invention, because the management information regarding the currently-recording data stream is recorded in the management information record area 232 allocated in the optical recording medium 100a, data recorded in the optical recording medium 100a can be reproduced even when the recording operation is abruptly interrupted by unexpected causes such as electric power interruption.

To describe the above in detail, when the power is supplied after unexpected cutoff, the controller 180 checks the status of the record flag set in the management information record area 232 to see whether the recording operation has been completed successfully. If the record flag is set, the controller 180 determines that the recording operation has been interrupted abnormally, and if not, determines that the recording operation has been completed successfully.

If it is determined from the record flag that the recording operation has been interrupted abnormally, the controller 180 reads data of the data record area 230 by using the management information recorded in the management information record area 232 of the optical recording medium 100a. For example, data streams regarding three titles may be recorded in the data record area 230, and the management information regarding only two titles may be recorded in the management information file (VR_MANGR.IFO), when the recording operation is interrupted. In the above case, information regarding the third title may not be read from the optical recording medium 100a. However, according to the present embodiment, because the management information regarding the third title is recorded in the management information record area 232, the third title can also be read by use of the management information of the management information record area 232. In other words, by updating the management information of the management information record area 232 onto the management information file (VR_MANGR.IFO) of the file information record area 220, the data regarding the third title can be successfully read from the data record area 230.

Figure 5:
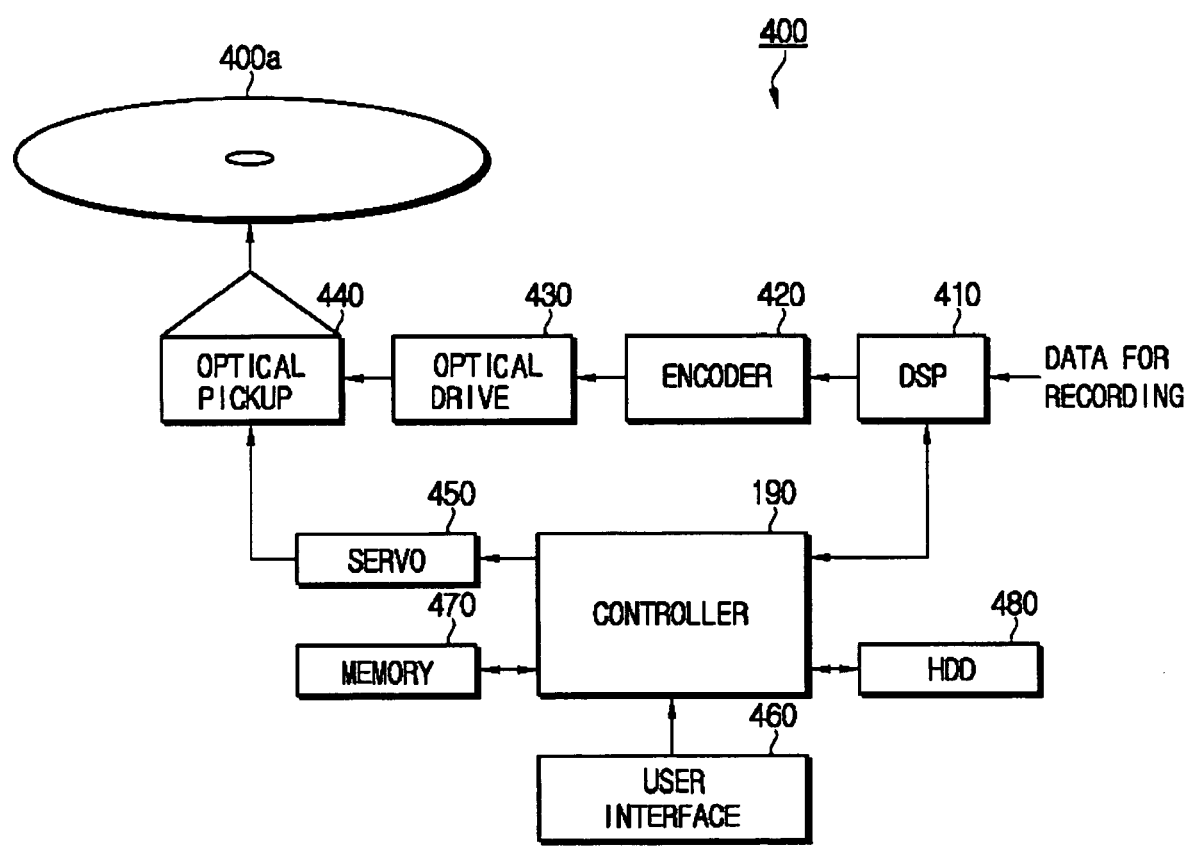
FIG. 5 is a block diagram of an optical recording and/or reproducing apparatus according to a second embodiment of the present invention.

FIG. 5 is a block diagram of an optical recording/reproducing apparatus according to a second embodiment of the present invention.

Referring to FIG. 5, the optical recording/reproducing apparatus 400 according to this embodiment includes a digital signal processor (DSP) 410, an encoder 420, an optical drive 430, an optical pickup 440, a servo 450, a user interface 460, a memory 470, a hard disk drive (HDD) 480 and a controller 490.

In the following particular exemplary embodiment of the present invention, an optical recording and/or reproducing apparatus 400 will be a DVD player (DVDP) having the HDD 480, using a DVD-RAM as an optical recording medium. Because the functions of the DSP 410, the encoder 420, the optical drive 430, the optical pickup 440, the servo 450, the user interface 460 and the memory 470 are substantially similar to those already described above with reference to FIG. 1, description thereof will be omitted for the sake of brevity.

In this particular embodiment, during the data recording on the optical recording medium 400a, the management information regarding the currently-recording data stream is recorded in the HDD 480, and upon completion of recording operation regarding one title, the management information recorded in the HDD 480 is copied onto the management information file (VR_MANGR.IFO) of the file information record area.

The controller 490 processes such that the data stream, encoded by the encoder 420, may be recorded in the HDD 480, or recorded in the optical recording medium 400a. In the description as set forth below, the encoded data stream is recorded in the optical recording medium 400a.

In response to the record request signal from the user interface 460, the controller 490 controls the encoder 420 to encode the data which is converted by the DSP 410 into a suitable record format. Accordingly, as the data stream in VOBU is generated by the encoder 420, the controller 490 controls the optical pickup 440 such that the encoded data stream can be recorded in the data record area of the optical recording medium 400a. Additionally, the controller 490 processes such that the management information regarding the currently-recording data stream can be recorded in the management information record area allocated in certain location of the HDD 480.

The HDD 480 can be managed by the file allocation table (FAT) file system.

Figure 6:
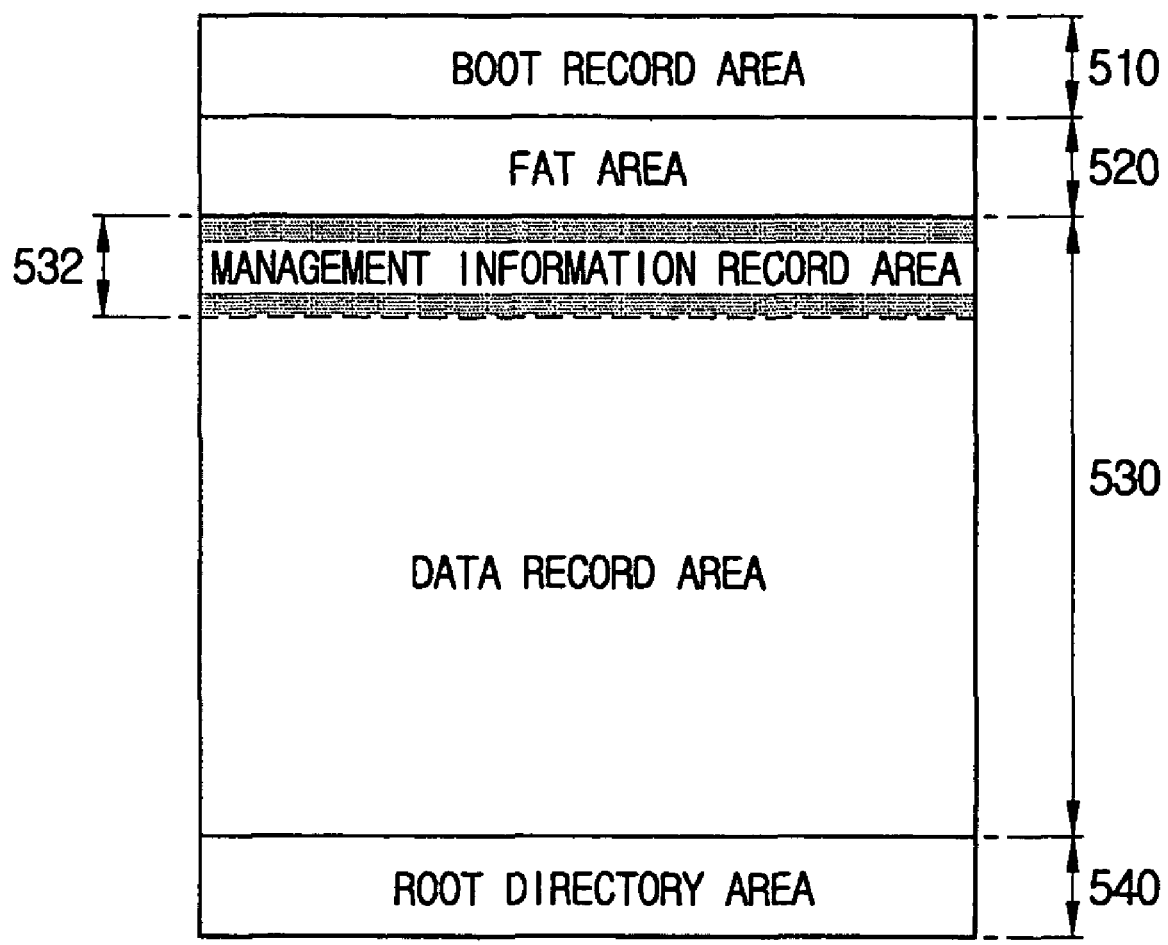
FIG. 6 is a view illustrating a physical data structure of the hard disk drive (HDD) of FIG. 5.

FIG. 6 is a view illustrating the physical data structure of HDD according to an embodiment of the present invention.

Referring to FIG. 6, the HDD 480 of FIG. 5 is divided into a boot record area 510, a FAT area 520, a data record area 530, a management information record area 532, and a root directory area 540. In the present embodiment, the management information record area 532 is a certain location allocated in the data record area 530.

The boot record area 510 includes therein information about the partitioning of record area, and the FAT area 520 includes therein information regarding cluster position and status, such as in which of the clusters of the data record area 530 the data stream is recorded, and in which sequence the clusters are connected.

The management information record area 532 temporarily stores therein management information regarding the data stream being recorded in the data record area 530. The management information is updated onto the file information record area of the optical recording medium 400a of FIG. 5 every time recording operation is completed regarding one title. The data record area 530 records therein substantive data stream. The root directory area 540 includes therein attribute information and position information of the data recorded in the data record area 530.

A certain area of the management information record area 532 is allocated as a record flag setting area to indicate normality or abnormality in the recording operation. The record flag is set when the recording operation is started, and reset upon completion of the recording operation. In other words, the record flag is reset when the copying of the management information of the management information record area 532 onto the management information file (VR_MANGR.IFO), is completed. Accordingly, the controller 490 checks the setting status of the record flag to confirm whether the recording operation has been completed successfully, or interrupted abnormally.

The controller 490 processes such that, every time the recording operation is completed with respect to one title, the management information recorded in the management information record area 532 of the HDD 480 is copied onto the management information file (VR_MANGR.IFO) which is recorded in the file information record area of the optical recording medium 400*a*.

Figure 7:
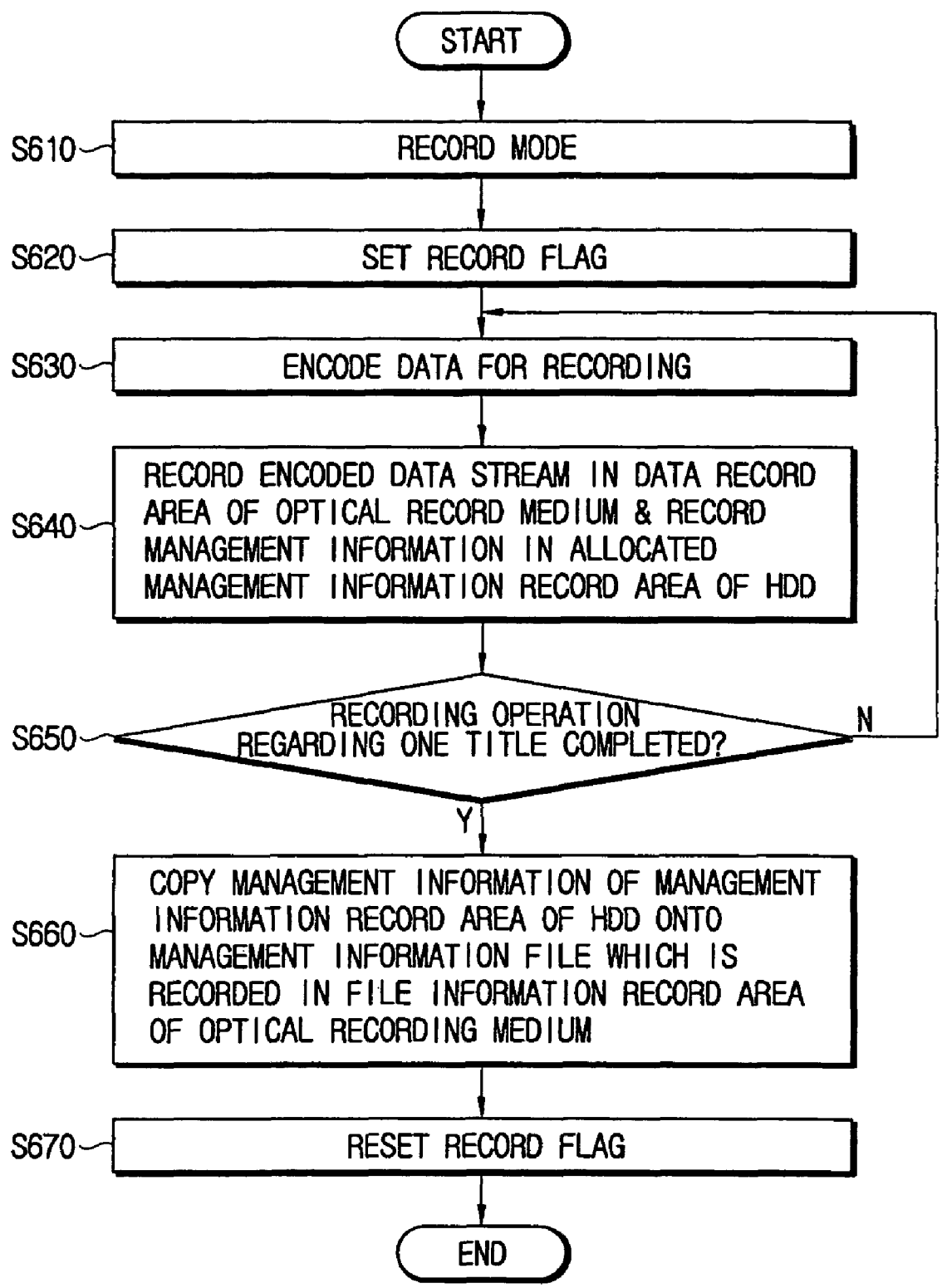
FIG. 7 is a flowchart illustrating a data recording method of an optical recording/reproducing apparatus of FIG. 5.

FIG. 7 is a flowchart illustrating the data recording method of the optical recording/reproducing apparatus employing the HDD of FIG. 5.

Referring to FIGS. 5 through 7, first, the controller 490 switches the optical recording/reproducing apparatus 400 to record mode in response to the record request signal received from the user interface 460 (operation S610), and sets an assigned record flag in the management information record area 532 (operation S620). The controller 490 controls the encoder 420 to encode the data which is converted into a suitable record format by the DSP 410 (operation S630)

Every time a data stream is generated on the basis of VOBU by the encoder 420, the controller 490 processes such that the encoded data stream can be recorded in the data record area of the optical recording medium 400*a*, and the management information of the data stream being recorded in the data record area 530 can be recorded in the management information record area 532 which is allocated in the data record area 530 of the HDD 480 (operation S640).

The controller 490 confirms whether the recording operation regarding one title is completed or not (operation S650), and if not, turns to the operation S630 to continue recording operation. If it is determined that the recording operation has been completed with respect to one title, the controller 490 processes such that the management information recorded in the management information record area 532 of the HDD 480 can be copied on to the management information file (VR_MANGR.IFO) which is recorded in the file information record area of the optical recording medium 400*a* (operation S660). Upon completion of the information copy onto the management information file (VR_MANGR.IFO), the controller 490 resets the record flag (operation S670).

The data recovery method of the above-described second embodiment, in the event of abrupt interruption of recording operation due to unexpected causes, is substantially identical to that of the first embodiment which has been described above. Therefore, the detailed description thereof will be omitted for the sake of brevity, but briefly, because management information regarding the data being recorded in the optical recording medium 400*a* is recorded in the HDD 480, the data can be properly reproduced from the optical recording medium 400*a* even when the recording operation is abruptly interrupted due to, for example, sudden power cutoff in the middle of operation, by use of the management information recorded in the HDD 480.

As described above, in a few exemplary embodiments of the optical recording/reproducing apparatus and data recording method thereof according to the present invention, because management information regarding the data being recorded in the optical recording medium is recorded in the management information record area allocated in certain location of the optical recording medium or a hard disk drive, data recorded on the optical recording medium can be properly reproduced even when the recording operation is abruptly interrupted in the middle of operation due to unexpected causes such as abrupt power cutoff.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An optical recording and/or reproducing apparatus, comprising:
   an optical pickup which records data onto a data record area of an optical recording medium which is loaded in the optical recording/reproducing apparatus; and
   a controller which
      allocates a specified area of the data record area of the optical recording medium as a management information record area,
      controls the optical pickup to record management information regarding the data recorded in the data record area in the management information record area, and
      controls the optical pickup to record a record flag in the management information record area,
   wherein the record flag indicates whether the recording of the management information has been completed or not, and
   the management information is copied to a predetermined area other than the management information record area.

2. The optical recording/reproducing apparatus of claim 1, wherein the management information record area is an area at least partially allocated in the data record area.

3. The optical recording/reproducing apparatus of claim 2, wherein every time the recording operation is completed for a title, the management information recorded in the management record area is copied onto a management information file in a file information record area.

4. A data recording method, comprising:
   allocating a specified area of an optical recording medium loaded in an optical recording and/or reproducing apparatus as a management information record area;
   recording data into a data recording area of the optical recording medium, and recording management information regarding the data in the allocated management information record area;
   recording a record flag in the management information record area;
   wherein, the record flag indicates whether the recording of the management information has been completed or not, and
   the management information is copied to a predetermined area other than the management information record area.

5. A data recovery method, comprising:
   determining whether a flag is set, the flag indicating whether the recording of the management information has been completed or not;
   reading management information from a medium based on the determining; and
   reproducing the data from the medium using the management information, wherein a predetermined area other than a management information record area comprises a copy of the management information recorded in the management information record area.

6. At least one non-transitory medium having computer readable code to control at least one processing element in a computer, the medium comprising:
    a data record area to store data and a management information record area which is allocated at a specified area of the data record area, to store management information regarding the data being recorded in the data record area;
    wherein the management information record area comprises a record flag indicating whether the recording of the management information has been completed or not, and
    the management information is copied to a predetermined area other than the management information record area.

7. The medium of claim 6, wherein the recording medium has a data structure managed by the universal disk format (UDF) file system.

8. An apparatus reproducing data recorded on a medium including a data record area, the apparatus comprising:
    an optical pickup unit which irradiates beams in order to read out the data recorded on the data record area of the medium;
    a controller which controls the optical pickup unit to reproduce management information from a management data record area which is allocated to the data record area of the medium,
    wherein the controller reproduces a flag included in the management information and determines whether the recording of the management information has been completed or not, based on the flag, and
    the management information is copied to a predetermined area other than the management information record area.

* * * * *